Figure 1:
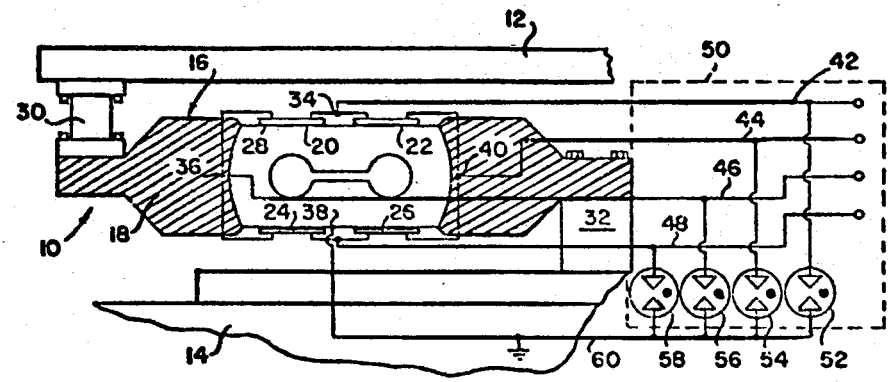

United States Patent [19]
Keen

[11] 3,917,981
[45] Nov. 4, 1975

[54] SCALE LIGHTNING PROTECTION SYSTEM
[75] Inventor: Harry J. Keen, Waterford, Vt.
[73] Assignee: Colt Industries Operating Corporation, New York, N.Y.
[22] Filed: June 4, 1974
[21] Appl. No.: 476,327

Related U.S. Application Data
[63] Continuation of Ser. No. 367,861, June 7, 1973, abandoned, which is a continuation of Ser. No. 257,966, May 30, 1972, abandoned.

[52] U.S. Cl. ............ 317/61.5; 73/141 A; 310/8.1; 317/62; 73/141 A; 317/61.5;62;31
[51] Int. Cl. ............................................. H02h 3/22
[58] Field of Search ................................ 310/8.1 73/141 A; 317/61.5; 317/62; 317/31

[56] References Cited
UNITED STATES PATENTS
1,817,030  8/1931  Eberhard .................. 310/8.1 X
3,267,321  8/1966  Gessford .................... 317/62 X
3,512,595  5/1970  Laimins ..................... 73/141 A
3,576,128  4/1971  Lockery ..................... 73/141 A
3,656,024  4/1972  Davis ...................... 317/61.5 X Primary Examiner—James D. Trammell
Attorney, Agent, or Firm—Gardiner, Sixbey, Bradford & Carlson

[57] ABSTRACT

The scale lightning protection system protects the electrical resistance strain gages of a scale from the effects of lightning strikes in the vicinity of the scale. Gas filled surge voltage protectors are mounted within the confines of a scale platform and are directly connected to the outputs of a strain gage bridge and to the grounded support for the strain gages forming the bridge.

8 Claims, 2 Drawing Figures

SCALE LIGHTNING PROTECTION SYSTEM

This is a continuation of application Ser. No. 367,861 filed June 7, 1973, which is a continuation of Ser. No. 257,966 filed May 30, 1972, both now abandoned.

BACKGROUND OF THE INVENTION

Modern weighing technology has included the development of a number of platform-type weighing scales of low profile construction which are particularly well adapted for use in outdoor applications such as vehicle weighing. Basically, these platform scale units consist of a platform which is suspended relative to a support structure by a plurality of weight-sensitive, load cell transducer elements. In low profile constructions, such transducer elements are commonly formed by beam-type electrical strain gage transducers, each of which includes a beam element connected between the scale platform and a support frame or base structure. Surface strains induced in the beam by loads applied to the scale platform are sensed by delicate resistance strain gage elements which are bonded to each beam element.

In most instances, the support frame or base structure of a low profile outdoor scale is in direct contact with the ground, and normally the platform structure is electrically tied to ground. Thus, such scale installations are very vulnerable to the high voltage transients caused by lightning, and lightning strikes in the local area containing a scale installation cause large ground currents and induced fields in the load cell cables. Lightning surges can induce thousands of amperes of current in the load cell circuit which result in destruction of the strain gage elements.

It is a primary object of the present invention to provide a novel and improved scale lightning protection system.

Another object of the present invention is to provide a novel and improved scale lightning protection system having substantially no resistance, capacitance, inductance, or current leakage to effect the calibration of a scale unit employing the load cell.

A still further object of the present invention is to provide a novel and improved scale lightning protection system which has no degrading effects on the operation of an associated load cell.

Another object of the present invention is to provide a novel and improved scale lightning protection system which is operative in the nanosecond range in response to lightning induced surges.

A still further object of the present invention is to provide a novel and improved load cell having an internal lightning protection circuit.

Figure 2:
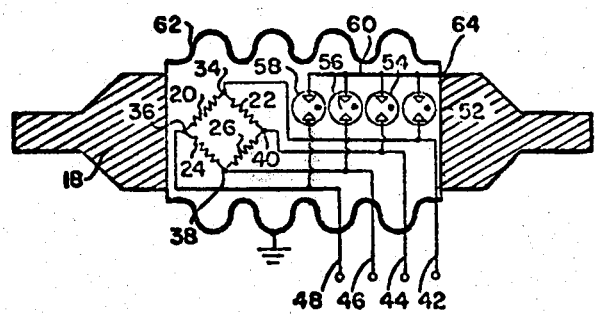

These and other objects of the present invention will become readily apparent upon a consideration of the following specification and claims taken in conjunction with the accompanying drawings in which:

FIG. 1 is a side view, partially in section, illustrating a low profile weighing scale structure including the load cell lightning protection circuit of the present invention; and FIG. 2 is a diagrammatic illustration of a beam-type electrical strain gage transducer including the load cell lightning protection system of the present invention.

Referring now to FIG. 1, a novel low profile weighing scale indicated generally at 10 includes a load platform 12 which is suspended from a base 14 by beam-type electrical strain gage transducer units, one of which is indicated at 16. Normally four beam-type electrical strain gage transducer units are employed to suspend the platform of a low profile scale; one such unit being positioned at each of the four corners of the load platform.

The beam-type electrical strain gage transducer 16 includes a deformable metallic beam member 18 which may constitute any one of a number of known bending beam structures. Bonded to the surface of the beam element are electrical resistance strain gages 20, 22, 24 and 26 which are positioned to sense the loadings applied to the beam element. These strain gages are each bonded to the metallic structure of the beam element by a thin layer or film of bonding cement 28 which mounts the strain gage a few thousandths of an inch from the steel or metallic structure of the beam element.

One end of the beam element 18 is secured by a mounting unit 30 to the load platform 12, while the opposite end of the beam element is bolted to the underlying frame or base of the scale as illustrated at 32. This places the beam element in direct electrical contact with the load platform and scale base.

With this scale structure, a load applied to the load platform 12 stresses the beam element 18 and surface strains of the beam element are sensed by the electrical resistance strain gages 20, 22, 24, and 26. These strain gages are connected in a typical Wheatstone bridge array which includes terminals 34, 36, 38 and 40 connected to transducer leads 42, 44, 46 and 48. The transducer leads terminate in a terminal box 50 which is mounted on the scale 10, preferably within the confines of the load platform 12. From the terminal box 50, the transducer leads 42, 44, 46 and 48 may be connected by cables to a power supply and indicator unit which, in some instances, may be located up to one thousand feet from the scale unit 10.

A lightning strike in an area adjacent to a scale having no protection for the beam-type electrical strain gage transducers 16 will cause large ground currents and induced fields in the cables leading to the transducer leads 42, 44, 46 and 48. Such high voltage lightning induced transients result in electrical arcing across the bonding film 28 to the metallic beam element 18, thereby often destroying the bonding film and shorting the electrical resistance strain gage units through the beam element to the scale frame. In many instances the electrical resistance strain gage units will be completely destroyed, but absent complete physical destruction, lightning induced arcing will change the calibration of the beam-type electrical strain gage transducer. This is due to the fact that the transducer is calibrated to provide span calibration and zero offset calibration for the specific physical characteristics thereof, and arcing between the electrical resistance strain gages and the beam element 18 destroys some of the intervening bonding film 28 to alter the span or zero offset calibration of the transducer.

Since the beam-type electrical strain gage transducer 16 is carefully calibrated to compensate for electrical and structural characteristics peculiar to the transducer, any alteration in these characteristics will destroy the calibration of the unit. Therefore, any electrical component added to the transducer electrical circuit must have substantially no resistance, no leakage current, no capacitance, and no inductances. If such electrical component is to provide lightning protection for the unit, it must additionally operate in the nanosecond range and be self restoring to permit operation of the beam-type electrical strain gage transducer after the effects of lightning have terminated. To provide lightning protection for each beam-type electrical strain gage transducer in the event of lightning strikes in the vicinity of the scale 10, gas filled surge voltage protectors 52, 54, 56 and 58 are connected to the transducer leads 42, 44, 46 and 48 respectively. It will be noted that this connection is made within the junction box 50, and it is desirable that the junction box be positioned within the confines of the load platform 12.

The gas filled surge voltage protectors 52, 54, 56 and 58 are also connected to a common line 60 which is directly connected to the beam element 18. For enhanced protection, it is beneficial to connect the line 60 directly to the element which physically supports the electrical strain gage units 20, 22, 24 and 26 and which in turn is in direct contact with the grounded elements of the scale 10. The fact that the line 60 constitutes part of the ground circuit for the unit is illustrated by the ground symbol in FIG. 1.

Gas filled surge voltage protectors 52, 54, 56 and 58 are of a type well known to the art which include two main electrodes properly spaced by a glass or ceramic insulator. These electrodes are generally bonded to the insulator and form a hermetically sealed discharge chamber which contains an inert gas. Known gas filled surge voltage protectors of this type are manufactured by Siemens Corporation of Iselin, N.J.

It must be noted that each beam-type electrical strain gage transducer employed in the weighing scale 10 of FIG. 1 includes the novel lightning protection circuitry illustrated for the beam-type electrical strain gage transducer 16. Since the junction box 50 is positioned within the confines of the load platform 12, a lightning strike outside the confines of the load platform will induce high voltage transient potentials on the cables connected to the transducer leads 42, 44, 46, and 48. However, large ground currents and induced fields in the input cables cause the gas filled surge protectors 52, 54, 56 and 58 to fire and ground the transducer leads 42, 44, 46 and 48 to the frame of the scale 10. These surge protectors have a very fast response time (nanosecond range), high current carrying capability, very high leakage resistance, very low capacitance, and no shunt inductance. Therefore, they have no degrading effect upon the calibration and operation of the beam-type electrical strain gage transducer.

There is no practical way to protect the scale 10 from a direct powerful strike of lightning, but in the majority of instances, damage to the scale results from strikes in the local area rather than from direct strikes. Generally, placing the junction box 50 with the gas filled surge voltage protectors 52, 54, 56 and 58 within the confines of the load platform 12 is sufficient to adequately protect the beam-type electrical strain gage transducer 16 from local lightning strikes, but for very close lightning strikes, it is conceivable that damaging voltage surges might be induced in the transducer leads 42, 44, 46 and 48 between the associated electrical resistance strain gages and the respective gas filled surge voltage protectors. To alleviate this condition, the lightning protected load cell unit of FIG. 2 may be employed. Most beam-type electrical strain gage transducers are provided with a shielding casing 62 which protects the electrical resistance strain gage circuitry and which may be in electrical contact with the supporting beam element 18. Generally, this shielding casing is metallic and therefore electrically conductive.

To provide a lightning protected transducer as illustrated in FIG. 2, the gas filled surge voltage protectors 52, 54, 56 and 58 are mounted within the casing 62 and are directly connected to the terminals 34, 36, 38 and 40 of the Wheatstone bridge containing the electrical resistance strain gages 20, 22, 24, and 26. The ground wire 60 may be connected directly to the casing 62 as indicated at 64, or may be connected to the beam element 18 as illustrated in FIG. 1. In some instances, the cell casing may not be at earth ground but may be insulated so that the beam-type electrical strain gage transducer is provided with a floating ground. When the transducer 16 of FIG. 1 is provided with a protective casing 62, the ground or return wire 60 may be connected to the casing if the casing is electrically grounded.

The novel structure of FIG. 2 results in a conductor connection of minimum length between the various terminals 34, 36, 38 and 40 of the Wheatstone bridge and the gas filled surge voltage protectors 52, 54, 56 and 58. Since the low inductance of such conductors often results in a very high voltage arc across the bonding film 28 for the electrical resistance strain gages when a lightning strike occurs, the protection provided is greatly enhanced if the gas filled surge voltage protectors are in close proximity to the Wheatstone bridge.

What is claimed is:

1. A weighing scale, comprising
   a. a scale support unit;
   b. a load platform;
   c. at least one electrically conductive load responsive member mounted between said scale support unit and said load platform;
   d. transducer means for providing a variable electrical characteristic which is a function of the magnitude of a load applied to said load platform, said transducer means including a plurality of strain gauges mounted on said electrically conductive load responsive member;
   e. a plurality of electrical transducer leads, each said transducer lead being connected at one end to one of said strain gauges;
   f. surge voltage protection means for protecting said strain gauges from surge voltages developed in said transducer leads, said surge voltage protection means including a plurality of protection units corresponding to the number of transducer leads, each unit having a first terminal and a second terminal separated by a high resistance to leakage current and a low resistance to voltage surges, said first terminals being respectively connected to said transducer leads within the confines of said load platform; and
   g. lead means for maintaining said second terminals and said load responsive member at substantially the same electrical potential, said lead means including a single conductive lead electrically connected at one end with said second terminals of said protection units and directly connected at the other end to said electrically conductive load responsive member.

2. The weighing scale of claim 1, wherein said load responsive member is a beam element adapted to bend in response to load applied to said load platform, said beam element having one end secured to said load platform and the opposite end secured to said scale support unit, said electrical resistance strain gauges being connected in a bridge circuit arrangement with said transducer leads connected to the terminals of said bridge circuit.

3. The weighing scale of claim 1, wherein said load responsive member is a metallic beam element with one end connected to said scale support unit and the opposite end connected for deflection by the application of a load to said load platform, said electrical strain gauges being bonded to the surface of said metallic beam element, and further wherein said single conductive lead includes an electrically conductive housing mounted on and in electrical contact with said metallic beam element, said housing enclosing said strain gauges.

4. The weighing scale of claim 3, wherein said protection units are mounted within said housing, and wherein said first terminals of said protection units are connected with said transducer leads within said housing.

5. The weighing scale of claim 1, wherein said scale support unit is electrically grounded and said load responsive member is electrically grounded through said scale support unit.

6. A weighing scale including a transducer lightning protection system, comprising a load platform; a scale support unit; at least one electrical strain gauge transducer means mounted between said load platform and scale support unit and operative to provide an electrical output which is a function of the magnitude of a load applied to said load platform, each such electrical strain gauge transducer means including at least one electrically conductive load responsive element; mounting means for mounting said load responsive element to said load platform and said scale support unit to cause a load applied to said load platform to stress said load responsive element; strain gauge means secured to said load responsive element to sense stresses resulting from the forces applied thereto and operative to provide a variable electrical characteristic indicative of said forces, said strain gauge means including a plurality of electrical resistance strain gauges connected to form a Wheatstone bridge array having a plurality of terminals; transducer leads connected to the terminals of said Wheatstone bridge array; surge voltage protection means mounted beneath and within the confines of said load platform and electrically connected to said transducer leads to become conductive in the nanosecond range in response to lightning induced surges on said transducer leads, said surge voltage protection means including a plurality of protection units corresponding in number to the number of transducer leads, each said protection unit having a first terminal and a second terminal separated by a high resistance to leakage current and a low resistance to voltage surges, said first terminals being electrically connected to said transducer leads, respectively; first circuit means providing a first conductive path from said electrically conductive load responsive element through said scale support to ground, and second circuit means providing a second conductive path separate from said first conductive path between said second terminals of each protective unit and said electrically conductive load responsive element on which the associated strain gauges are mounted.

7. The weighing scale of claim 6 wherein said electrical resistance strain gauges are bounded to the surface of said load responsive element by a thin layer of bonding material, said surge voltage protection means operating to prevent electrical arcing between said load responsive element and the electrical resistance strain gauges bonded thereto across said thin layer of bonding material in response to lightning induced surges on said transducer leads.

8. The weighing scale of claim 7, wherein said second circuit means includes an electrically conductive housing enclosing each electrical strain gauge transducer means, said housing being mounted in electrical contact with the load responsive elements enclosed thereby, and an electrical connection between said housing and the protection units for the electrical strain gauge means enclosed within said housing.

* * * * *